United States Patent [19]

Kawashima et al.

[11] Patent Number: 4,481,241
[45] Date of Patent: Nov. 6, 1984

[54] CORE MATERIAL FOR FIBER REINFORCED PLASTIC AND PROCESS FOR ITS PRODUCTION

[75] Inventors: Sadao Kawashima, Kanagawa; Heiichi Takei, Ibaraki, both of Japan

[73] Assignee: Asahi Fiber Glass Company Limited, Tokyo, Japan

[21] Appl. No.: 417,574

[22] Filed: Sep. 13, 1982

[30] Foreign Application Priority Data

Oct. 30, 1981 [JP] Japan .................. 56-172939
May 14, 1982 [JP] Japan .................. 57-80117
May 14, 1982 [JP] Japan .................. 57-80118

[51] Int. Cl.³ .............................. B32B 3/10
[52] U.S. Cl. .................................. 428/134; 156/148; 427/389.8; 428/131; 428/138; 428/219; 428/283; 428/290; 428/297; 428/300; 428/325; 428/402; 428/406; 428/420
[58] Field of Search .............. 428/219, 220, 290, 297, 428/300, 301, 303, 325, 340, 131, 134, 135, 137, 406, 407, 283, 313.9, 402, 402.2, 420, 138, 298, 299, 285; 156/148; 427/389.8

[56] References Cited

U.S. PATENT DOCUMENTS

| 2,517,753 | 8/1950 | Ximenez et al. | 427/389.8 |
| 2,794,238 | 6/1957 | Dildilian et al. | 428/300 |
| 2,794,759 | 6/1957 | Dildilian | 428/300 |
| 3,846,164 | 11/1974 | Lagache et al. | 427/389.8 |
| 3,931,441 | 1/1976 | Milewski | 428/290 |
| 4,178,406 | 12/1979 | Russell | 428/298 |
| 4,201,612 | 5/1980 | Figge et al. | 264/257 |

*Primary Examiner*—James J. Bell
*Attorney, Agent, or Firm*—Oblon, Fisher, Spivak, McClelland & Maier

[57] ABSTRACT

A core material for a fiber reinforced plastic comprises a glass fiber mat composed of glass fiber bundles and having a bulk density of from 50 to 150 kg/m³ and a porous material filled in void spaces in the glass fiber mat. The porous material is composed of a mixture of a thermoplastic resin and a filler such as a hollow inorganic filler.

The core material is prepared by impregnating a glass fiber mat composed of elongated glass fiber bundles, with a mixture of the filler and a dispersion of the thermoplastic resin in a dispersing medium and their evaporating the dispersing medium from the impregnated glass fiber mat.

26 Claims, 1 Drawing Figure

CORE MATERIAL FOR FIBER REINFORCED PLASTIC AND PROCESS FOR ITS PRODUCTION

BACKGROUND OF THE INVENTION

1. Field of the Invention

The present invention relates to a core material for a fiber reinforced plastic (hereinafter referred to simply as "FRP") and a process for producing the core material.

2. Description of the Prior Art

FRP is widely used as various structural or construction materials such as panels, light weight hull construction material, or hybrid materials. In a case where an extremely high strength is required, the FRP structural material must be made correspondingly thick, which brings about difficulties such that with an increase of the thickness, the structural material becomes heavy and tends to undergo deformation, the production costs will increase and a longer time will be required for the production. In an attempt to overcome such difficulties, a sandwich panel has been proposed in which FRP is bonded to both sides of a light weight core material to form an integral structure.

However, such a sandwich panel is substantially inferior in its strength to a FRP plate having the same thickness. It has an additional drawback that the surface material (i.e. FRP constituting the surface layers) is likely to be separated or peeled off from the core material.

SUMMARY OF THE INVENTION

It is an object of the present invention to provide a core material for FRP which is strong and light in weight and can readily be produced and can firmly be bonded to the surface material so that the adhesion between the surface material and the core material becomes so good that no separation or peeling is likely to occur.

The present invention provides a core material for FRP which comprises a glass fiber mat composed of glass fiber bundles and having a bulk density of from 50 to 150 kg/m$^3$ and a porous material filled in void spaces in the glass fiber mat, said porous material being composed of a mixture of a thermoplastic resin and a filler.

Other objects and features of the present invention will become apparent from the following detailed description of the preferred embodiments.

DETAILED DESCRIPTION OF THE PREFERRED EMBODIMENTS

Figure 1:
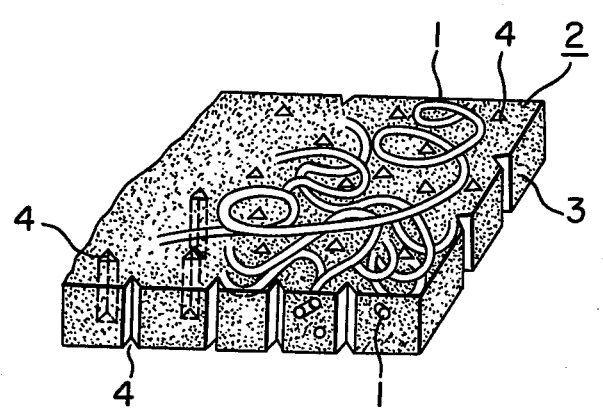
FIG. 1 is a perspective view of a preferred embodiment of the core material for FRP according to the present invention.

Referring to FIG. 1, the present invention provides a core material which comprises a mat 2 composed of glass fiber bundles 1 and having a bulk density of from 50 to 150 kg/m$^3$, preferably from 75 to 120 kg/m$^2$ and a porous material 3 composed of a mixture of a thermoplastic resin and a filler. In the preferred embodiment illustrated in the Figure, the core material is further provided with a number of perforations 4.

As the glass fiber bundle, there may preferably be used a strand composed of from 50 to 200 glass fibers having a diameter of from 13 to 25 microns, withdrawn from a bushing and bound into a bundle by a binder in an amount of from 0.3 to 0.8% by weight as a solid, such as a vinyl acetate emulsion, a polyester emulsion or an epoxy resin emulsion, and having a weight of from 20 to 250 g per 1,000 m. the above-mentioned strands may be used directly for the production of the mat, but they may be once wound up as a cake and then unwound for the production of the mat.

The glass fiber bundles are thrown onto the moving conveyor belt to form a glass fiber mat 2 having a predetermined thickness. The glass fiber bundles may be uncut continuous strands or may be strands cut into a length of at least 1 m, preferably at least 2 m.

With use of the long glass fiber bundles, the mat having the above mentioned bulk density can readily be prepared. In this case, a thermosetting mat binder such as an unsaturated polyester resin powder containing about 1% by weight of an organic peroxide (such as benzylperoxide) as a hardening agent, is applied in an amount of from 2 to 8% by weight to the glass fiber bundles, followed by heating at a temperature of from 200° to 250° C. for from 1 to 3 minutes to obtain a mat. With use of a core material made of such a glass fiber mat 2, an extremely good result can be obtained.

In a case where glass fiber bundles cut into a relatively short length of from 10 to 30 cm, are used, if the glass fiber bundles 1 are simply dropped and piled on the running conveyor belt, the bulk density of the mat tends to be too great. In such a case, a good result can be obtained by simultaneously supplying the thermoplastic resin and filler described hereinafter together with the glass fiber bundles.

Further, a glass fiber mat prepared by winding up glass fibers withdrawn from the bushing and coated with a binder, on a drum having a large diameter while traversing the fibers, cutting the cylindrically-wound collection of fibers in parallel with the axis of the drum, spreading it in a form of a plate and stretching it to obtain a predetermined thickness, may also advantageously used as the core material.

As the thermoplastic resin, there may be used a polyvinyl-chloride resin, a novolak type epoxy resin, a resol type phenol resin, an acrylic acid ester resin or an unsaturated polyester resin containing no cross-linking agent, or a mixture thereof. Among them, the unsaturated polyester resin containing no cross-linking agent gives a particularly good result.

As the filler, there may be used hollow glass beads, silus balloons, pearlite grains, or powder of calcium carbonate, clay, mica, alumina, dolomite, silica, diatom earth or asbestos. Among them, hollow light weight fillers such as the hollow glass beads and silus balloons give particularly good results.

The mixing ratio of the thermoplastic resin (as the solid component) to the filler is preferably within a weight ratio of from 100:150 to 100:800.

A mixture of the powdery thermoplastic resin and the filler may be introduced into vacant spaces in the glass fiber mat 2 by e.g. blowing, followed by heating to slightly soften the thermoplastic resin whereby the glass fiber bundles and the thermoplastic resin and filler are integrally bound. A particularly good result can be obtained by mixing the filler with a dispersion prepared by dispersing the thermoplastic resin in a proper dispersing medium such as water, to form a paste and impregnating the glass fiber mat with this paste, and then evaporating the dispersing medium.

Further, such a mixture may be prepared in the following manner. A surface active agent, preferably a non-ionic surfactant such as a polyoxyethylenealkylphenyl ether, is added to the thermoplastic resin such as an unsaturated polyester resin containing no cross-linking agent, and the mixture is heated and admixed. Then, water is gradually added thereto for inverse emulsification and the emulsified mixture is then alkalized to obtain a dispersion, preferably by an addition of ammonia. Hollow glass beads or a mixture of hollow glass beads and silus balloons is added to the dispersion, and thoroughly mixed with a mixer, whereby a paste-like mixture composed of a dispersion of the resin and the filler is obtainable.

The weight ratio of the glass fiber mat to the core material i.e. the glass fiber mat plus the porous material (the porous material being the mixture of the thermoplastic resin (as the solid content) and the filler), is preferably from 100:150 to 100:450, more preferably from 100:170 to 100:350.

In the preferred embodiment illustrated in the Figure, a number of perforations 4 are provided on the plate-like core material. The size of the perforations is preferably from 0.3 to 3 mm$^2$ in the cross sectional area, and the number of the perforations is preferably from 0.5 to 5 per cm$^2$. The cross sectional shape of the perforations is not critical, but a particularly good result is obtainable when the cross sectional shape is triangular. Such perforations can advantageously be formed by piercing with a needle having a triangular cross section.

The core material for FRP of the present invention having the above described construction has the following superior properties.

The core material for FRP of the present invention is integrally composed of the glass fiber mat 2 having a small bulk density and the thermoplastic resin and the filler, and vacant spaces among the glass fiber bundles are filled with the mixture of the thermoplastic resin and the filler, and the great compression resistance of the core material is attained. Thus, with use of the core material for FRP of the present invention, it is possible to obtain FRP having a great compression resistance, being light in weight and having great tensile and bending strengths. This effect is remarkable especially when long glass fiber bundles and, as the filler, hollow inorganic particles such as hollow glass beads or silus ballons are used.

Further, the core material for FRP of the present invention has a flexibility and can be wound up in a form of a roll for supply. Thus, the packaging and transportation can thereby be facilitated, and it can be used conveniently. By virtue of the flexibility, the core material of the present invention can be advantageously used for the production of a curved FRP such as a corrugated FRP.

The mixture of the thermoplastic resin and the filler constituting the porous material in the core material of the present invention has a proper porosity, whereby the following effect is obtainable.

When a fiber reinforcing member impregnated with a non-hardened liquid thermosetting resin (i.e. non-hardened FRP) is placed on the surface of the core material of the present invention, the thermosetting resin penetrates into the mixture through the pores, whereupon the core material hardens together with the non-hardened FRP placed on the surface thereof. Thus, the strength of the core material is thereby increased and the FRP surface layer and the core material are strongly bonded to each other. The sandwich panel thereby obtained is free from the inter-layer separation or peeling.

If the porosity of the mixture is too small, the penetration of the resin into the core material tends to be inadequate. On the other hand, if the porosity is too great, the amount of impregnation of the resin relative to the core material becomes great, thus resulting in an increase of the specific gravity of the product. The porosity is preferably within a range of from 30 to 60% (excluding the volume of the hollow portions).

As the thermoplastic resin, there may be used a polyvinyl chloride resin, a polyvinyl acetate resin, a novolak type phenol resin or an acrylic acid ester resin. However, for FRP, a resin composed essentially of an unsaturated polyester resin containing no cross-linking agent is most suitable. Upon penetration of the cross-linking agent (i.e. styrene) contained in the non-hardened FRP overlaid on the surface of the core material into the core material, the unsaturated polyester resin in the core material is also hardened, whereby FRP having an extremely great strength is obtainable.

Further, it is possible to use as the core material an integral product prepared by overlaying a glass fiber chopped strand mat (formed by binding a mat-like material obtained by piling glass fiber bundles having a length of from 25 to 200 mm in a predetermined thickness, with a binder of a saturated polyester resin powder) on both sides of a glass fiber mat (prepared by piling uncut continuous glass fiber bundles or glass fiber bundles having a length of at least 1 m, preferably at least 2 m, in a predetermined thickness and filling a porous material composed of a mixture of a thermoplastic resin and a filler), followed by needle stitching with or without organic fibers or glass fibers. This core material is three-dimensionally reinforced by the needle stitching. Therefore, a FRP plate produced with use of this core material has high strength against the shearing force when a bending load is imparted thereto. Further, it has a high strength also against an inner side shearing force when a tensile load is imparted to the surface members of the FRP plate.

In the preferred embodiment, the core material for FRP is provided with a number of perforations, whereby the penetration of the resin or a cross-linking agent proceeds swiftly and adequately, thus providing great effectiveness for the increase of the strength of FRP and for the prevention of the inter-layer separation or peeling.

Now, the present invention will be described in further detail with references to Examples.

EXAMPLE 1

To a mixture comprising 93 parts by weight of an unsaturated polyester resin containing no cross-linking agent and 7 parts by weight of methyl ethyl ketone, 10 parts by weight of Emulsit 49 (Tradename, manufactured by Daiichi Kogyo Seiyaku K.K.) was added as a surface active agent, and while the mixture is heated at a temperature of from 80° to 90° C., warm water (70° C.) was gradually added for inverse emulsification. Further, a 1% aqueous ammonia solution and water were added, whereby a dispersion (resin content as solid: 20%) of the unsaturated polyester resin containing no cross-linking Agent and having a pH of 9.3 was prepared.

To 100 parts by weight of the above dispersion of the unsaturated polyester resin containing no cross-linking agent, 120 parts by weight of a filler (bulk density: 0.27)

composed of a mixture comprising hollow glass beads having a bulk density of 0.2 and silus balloons having a bulk density of 0.4 in a proportion of 2:1 by weight, was added and mixed by a mixer, while adding water whereby a paste-like mixture (solid content: about 30%) was obtained.

Then, the paste-like mixture was applied to and impregnated in a continuous glass fiber mat (bulk density: 100 kg/m$^3$, mat thickness: 4.5 mm, unit weight: 450 g/m$^2$) (which was prepared by curlily piling a continuous glass fiber bundle (40 g/1000 m) composed of 70 glass fibers each having a diameter of 17μ and bound by a binder upon withdrawal from a bushing; applying 4% by weight of a polyester resin to the piled glass bundle and heating the piled glass bundle containing the polyester resin at a temperature of 250° C. for 3 minutes) in an amount of 3,800 g per/m$^2$ of the mat. The impregnated glass fiber mat was dried to obtain a core material for FRP.

Then, the core material was pierced to obtain a perforated core material having an average of 2.2 perforations per 1 cm$^2$, each perforation having a triangular cross sectional area of 1 mm$^2$. The perforated core material had a porosity of about 40%, a thickness of 5 mm and a unit weight of 1,600 g/m$^2$.

A glass fiber chopped strand mat (CM 605 FA, manufactured by Asahi Fiber Glass Co., Ltd., unit weight: 600 g/m$^2$) was laminated on both sides of the perforated core material. To the lamination thus obtained, a mixture of an unsaturated polyester resin (157 BQT, manufactured by Showa Kobunshi Kagaku K.K.) with 1% by weight of a hardening catalyst, methylethylketoneperoxide (Tradename: Permek-N, manufactured by Nippon Oil & Fats Co., Ltd.) was applied and impregnated by a hand lay-up method, and after removal of bubbles, the impregnated lamination was hardened at room temperature of 28° C. under a relative humidity of 78%, whereby a sandwich panel with FRP layers having a glass fiber content of 30% by weight was obtained. The properties of this sandwich panel are shown in Table 1.

EXAMPLES 2 to 4

Core materials were prepared in the same manner as in Example 1 with use of different paste-like mixtures as shown in Table 1.

The core materials of Examples 2 and 3 were then perforated in the same manner as in Example 1, while no perforation was provided in the core material of Example 4.

With respect to each core material, the bulk density of the filler, the bulk density, thickness and unit weight of the mat, the amount of the paste-like mixture applied to the mat, and the porosity and thickness of the core material are shown in Table 1. The number of perforations provided in the core materials of Examples 2 and 3 is also indicated in Table 1.

With use of these core materials, sandwich panels were prepared in the same manner as in Example 1. The constructions and properties of the respective sandwich panels are shown in Table 1.

COMPARATIVE EXAMPLE 1

As the core material, Palsa (wood of Family Banya produced in South America and being characterized by its light weight, thickness: 5.2 mm, specific gravity: 0.18) was used.

On both sides of this core material, a glass fiber chopped strand mat (CM-605 FA, manufactured by Asahi Fiber Glass Co., Ltd., unit weight: 600 g/m$^2$) was laminated. Under the same conditions as in Example 1, the lamination thereby obtained were treated, whereby a sandwich panel with FRP layers having a glass fiber content of 30% was obtained. The properties of the sandwich panel are shown in Table 1.

COMPARATIVE EXAMPLE 2

As the core material, a vinyl chloride foamed material (Trade name: Vinifoam, manufactured by Funabashi Kasei K.K., thickness: 5.2 mm, specific viscosity: 0.1) was used.

On both sides of this core material, a glass fiber chopped strand mat (CM 605 FA, manufactured by Asahi Fiber Glass Co., Ltd., unit weight: 600 g/m$^2$) was laminated. Under the same conditions as in Example 1, the lamination thereby obtained were treated, whereby a sandwich panel with FRP layers having a glass fiber content of 30% was obtained. The properties of this sandwich panel are shown in Table 1.

TABLE 1

|  | Exp. 1 | Exp. 2 | Exp. 3 | Exp. 4 | Comp. Exp. 1 | Comp. Exp. 2 |
|---|---|---|---|---|---|---|
| Filler (wt. %) | Q-cell: 67% Silus: 33% | Q-cell: 100% | Q-cell: 70% Silus: 30% | Q-cell: 100% | — | — |
| Bulk density of the filler | 0.27 | 0.18 | 0.27 | 0.18 | — | — |
| Dispersion: filler (wt. ratio) | 10:12 | 10:3.8 | 10:4.9 | 10:3.8 | — | — |
| Bulk density of mat (kg/m$^3$) | 100 | 100 | 100 | 103 | — | — |
| Thickness of mat (mm) | 4.5 | 4.0 | 4.5 | 3.9 | — | — |
| Unit weight of mat (g/m$^2$) | 450 | 400 | 450 | 400 | — | — |
| Paste applied (g) | 3,800 | 2,200 | 3,200 | 2,000 | — | — |
| Perforations of 1 mm$^2$ in cross section (number/cm$^2$) | 2.2 | 1.8 | 2.2 | — | — | — |
| Porosity (%) | About 40 | About 45 | About 40 | About 45 | — | — |
| Thickness of core material (mm) | 5 | 5.2 ± 0.2 | 5.2 ± 0.4 | 5.0 ± 0.2 | 5.2 | 5.2 |

TABLE 1-continued

|  | Exp. 1 | Exp. 2 | Exp. 3 | Exp. 4 | Comp. Exp. 1 | Comp. Exp. 2 |
|---|---|---|---|---|---|---|
| Unit weight of core material (g/m$^2$) | 1,600 | 1,050 ± 110 | 1,400 ± 200 | 1,000 ± 100 | 955 | 338 |
| Thickness of panel (mm) | 7.2 | 7.1 | 7.1 | 6.9 | 7.8 | 7.6 |
| Thickness of panel core material | 4.3 | 4.4 | 4.5 | 4.5 | 5.2 | 5.2 |
| Thickness of upper FRP layer (mm) | 1.4 | 1.2 | 1.2 | 1.1 | 1.4 | 1.2 |
| Thickness of lower FRP layer (mm) | 1.5 | 1.5 | 1.4 | 1.3 | 1.2 | 1.2 |
| Specific gravity of panel | 1.02 | 0.98 | 1.06 | 1.01 | 0.74 | 0.93 |
| Bending strength of panel (kg/mm$^2$) | 16.4 | 15.8 | 16.2 | 13.8 | 11.4 | 4.18 |
| Modulus of bending elasticity of panel (kg/mm$^2$) | 890 | 880 | 895 | 860 | 585 | 255 |
| Deflection (mm) | | | | | | |
| Load 40 kg | 1.04 | 1.03 | 1.01 | 1.05 | 1.18 | 1.56 |
| Load 60 kg | 1.63 | 1.64 | 1.64 | 1.66 | 1.87 | 2.33 |
| Load 80 kg | 2.18 | 2.26 | 2.20 | 2.28 | 2.55 | Break |
| Load 100 kg | 2.73 | 2.89 | 2.79 | 2.91 | 3.25 | Break |

Notes:
[1]Q-cell: Hollow glass beads having a bulk density ranging from 0.18 to 0.23.
[2]Silus: Silus balloons having a bulk density of 0.4
[3]Dispersion: Aqueous dispersion (resin content as solid: 20% by weight) of an unsaturated polyester resin containing no crosslinking agent and having a pH of 9.3
[4]Paste: Paste-like mixture composed of the dispersion and the filler (total solid content: 30%)
[5]Defelction: Each panel having a width of 50 mm was placed on a pair of bearing members spaced by 100 mm in the longitudinal direction of the panel and a load of 40 kg, 60 kg, 80 kg or 100 kg was put on the panel at its longitudinal center i.e. 50 mm from each bearing member, whereby the deflection of the panel was measured in mm.

In each of Examples 1 to 4, the thickness of the core material decreased when it was assembled into the sandwich panel. The reason for the decrease of the thickness of the core material is considered to be such that the unsaturated polyester alkyd resin in the core material was dissolved by styrene contained in the unsaturated polyester resin incorporated for the preparation of the panel.

From Table 1, it is seen that the sandwich panels prepared with use of the core materials of the present invention (i.e. Examples 1 to 4) are superior in the mechanical properties to the sandwich panels of Comparative Examples.

Particularly when the perforated core material are used (i.e. Examples 1 to 3), the unsaturated polyester resin incorporated for the preparation of the panel penetrates through the numerous perforations to the porous portions of the core material, and the penetrated resin is chemically bonded to the unsaturated polyester alkyd resin in the core material, whereby the adhesion between the core material and the FRP layers is improved. Accordingly, the sandwich panels thereby obtained have extremely high bending strength as compared with the sandwich panels prepared with use of the conventional core materials (Palsa and the vinyl chloride foamed material).

Further, the core materials for FRP according to the present invention are composed of a glass fiber mat with its vacant spaces filled with a mixture of the unsaturated alkyd resin and a filler of hollow inorganic particles. Accordingly, the sandwich panels with use of such core materials have extremely great modulus of bending elasticity as compared with the sandwich panels prepared with use of the conventional core materials, and they are free from inter-layer separation or peeling. Their deflection is substantially smaller than that of the panels produced with use of the conventional core materials thus indicating the superior mechanical strength. Further, their water absorption rates are extremely small as compared with the panel with use of an organic core material.

We claim:

1. A core material for a fiber reinforced plastic comprising a perforated glass fiber mat composed of glass fiber bundles and having a bulk density of from 50 to 150 kg/m$^3$ and a porous material filled in void spaced in the glass fiber mat, said porous material being composed of a mixture of a thermoplastic resin and a filler wherein the thermoplastic resin is an unsaturated polyester resin containing no cross-linking agent.

2. The core material according to claim 1 wherein the filler is hollow inorganic particles.

3. The core material according to claim 1 wherein the bulk density of the glass fiber mat is from 75 to 120 kg/m$^3$.

4. The core material according to claim 1 wherein each glass fiber bundle is composed of from 50 to 200 glass fibers each having a diameter of from 13 to 25 microns and has a weight of from 20 to 250 g per 1,000 m.

5. The core material according to claim 1 wherein the glass fiber bundles are continuous strands.

6. The core material according to claim 1 wherein the glass fiber bundles have a length of at least 1 m.

7. The core material according to claim 1 wherein the filler is hollow glass beads or silus balloons, or a mixture thereof.

8. The core material according to claim 1 wherein the weight ratio of the thermoplastic resin as a solid component to the filler in the mixture is within a range of from 100:150 to 100:800.

9. The core material according to claim 1 wherein the weight ratio of the glass fiber mat to the glass fiber mat plus the porous material is within a range of from 100:150 to 100:450.

10. The core material according to claim 1 wherein perforations are provided in the core material at a rate of from 0.5 to 5 perforations per cm$^2$ and each perforation has a cross sectional area of from 0.3 to 3 mm$^2$.

11. The core material according to claim 1 or 12 wherein the perforations have a triangular cross section.

12. The core material according to claim 1 wherein the porous material has a porosity of from 30 to 60%.

13. A sandwich panel, comprising:
(a) a core material comprising a glass fiber mat composed of glass fiber bundles and having a bulk density of from 50 to 150 kg/m$^3$ and a porous material filled in the void spaced in the glass fiber mat, said porous material being composed of a mixture of a thermoplastic resin and a filler wherein the thermoplastic resin is an unsaturated polyester resin containing no cross-linking agent, and
(b) a fiber reinforced plastic surface layer bonded to a surface of said mat.

14. The sandwich panel of claim 13, wherein the glass fiber mat is provided with a number of perforations.

15. A process for producing a core material for FRP which comprises:
impregnating a glass fiber mat composed of long glass fiber bundles with a mixture of a filler and a dispersion of a thermoplastic resin in a dispersing medium wherein the thermoplastic resin is an unsaturated polyester resin containing no cross-linking agent,
evaporating the dispersing medium from the impregnated glass fiber mat, and
needle piercing to provide a number of perforations in the core material,
wherein the resulting core material has a bulk density of from 50 to 150 kg/m$^3$.

16. The process according to claim 15 wherein the filler is hollow inorganic particles.

17. The process according to claim 15 wherein the bulk density of the glass fiber mat is from 75 to 120 kg/m$^3$.

18. The process according to claim 15 wherein each glass fiber bundle is composed of from 50 to 200 glass fibers each having a diameter of from 13 to 25 microns and has a weight of from 20 to 250 g per 1,000 m.

19. The process according to claim 15 wherein the glass fiber bundle ss are continuous strands.

20. The process according to claim 15 wherein the glass fiber bundles have a length of at least 1 mm.

21. The process according to claim 15 wherein the filler is hollow glass beads or silus balloons, or a mixture thereof.

22. The process according to claim 15 wherein the weight ratio of the thermoplastic resin as a solid component to the filler in the mixture is within a range of from 100:150 to 100:800.

23. The process according to claim 15 wherein the weight ratio of the glass fiber mat to the glass fiber mat plus the porous material is within a range of from 100:150 to 100:450.

24. The process according to claim 15 wherein perforations are provided in the core material at a rate of from 0.5 to 5 perforations per cm$^2$ and each perforation has a cross sectional area of from 0.3 to 3 mm$^2$.

25. The process according to claim 15 or 24 wherein the perforations have a triangular cross section.

26. The process according to claim 15 wherein the porous material has a porosity of from 30 to 60%.

* * * * *